United States Patent [19]
Fletcher et al.

[11] 3,866,128
[45] Feb. 11, 1975

[54] RANDOM PULSE GENERATOR

[76] Inventors: James C. Fletcher, Administrator of the National Aeronautics and Space Administration with respect to an invention of; Reed S. Lindsey, Jr., Houston, Tex.

[22] Filed: June 25, 1973

[21] Appl. No.: 373,588

[52] U.S. Cl.................. 328/59, 307/260, 324/78 J, 331/78
[51] Int. Cl....... H03k 1/00, H03k 3/04, H03b 29/00
[58] Field of Search...................... 331/78; 307/260; 328/59–62; 324/78 J

[56] References Cited
UNITED STATES PATENTS

| | | | |
|---|---|---|---|
| 3,304,515 | 2/1967 | Stieler | 331/78 |
| 3,612,845 | 10/1971 | Lawlor | 331/78 |
| 3,706,941 | 12/1972 | Cohn | 331/78 |
| 3,725,677 | 4/1973 | Lawlor | 331/78 |
| 3,725,784 | 4/1973 | Bayer | 324/130 |

*Primary Examiner*—Stanley D. Miller, Jr.
*Attorney, Agent, or Firm*—Carl O. McClenny; Marvin F. Matthews; John R. Manning

[57] ABSTRACT

An exemplary embodiment of the present invention provides a source of random width and random spaced rectangular voltage pulses whose mean or average frequency of operation is controllable within prescribed limits of about 10 hertz to 1 megahertz. A pair of thin-film metal resistors are used to provide a differential white noise voltage pulse source. Pulse shaping and amplification circuitry provide relatively short duration pulses of constant amplitude which are applied to anti-bounce logic circuitry to prevent ringing effects. The pulse outputs from the anti-bounce circuits are then used to control two one-shot multivibrators whose output comprises the random length and random spaced rectangular pulses. Means are provided for monitoring, calibrating and evaluating the relative randomness of the generator.

7 Claims, 2 Drawing Figures

RANDOM PULSE GENERATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

The present invention relates to pulse producing circuitry and more particularly to such circuitry for producing random length and random separation square wave pulses by the use of a white noise source and logic circuitry.

The field of experimental testing in various disciplines ranging from psychiatry to nuclear physics calls for the use of random sources of electrical pulses for testing purposes. In one particular testing application it may be desirable to have random pulses generated at an average or approximate frequency of as low as ten hertz. This may be the case in a test where human response is involved in the testing apparatus and relatively slow human reaction times are involved. On the other hand, in testing scientific equipment such as multichannel analyzers of spectrometers it may be desirable to have random pulses occurring at a frequency as high as approximately one megahertz. Thus a proportionately wide band random pulse generator which is relatively simple and economical to construct can fill a definite need in the range of testing apparatus for laboratory instrumentation in present usage.

In the prior art many types of random pulse generators have been designed for a specific purpose. Such designs typically have an average operating frequency which is determined by the particular need of the instrumentation to which the random pulse source is being applied for testing. An average operating frequency for a particular testing application may be specified in the operation of the random pulse generator and frequencies significantly different from the average frequency are either not possible due to physical circuit constraints or if the average frequency of operation of the random pulse source is controllable in some manner it may only be controllable over a relatively narrow frequency range.

In this regard several prior art random pulse generator circuits have employed variable frequency oscillators which are variable over a relatively narrow frequency range. Such random pulse generators have produced random pulses by randomly varying the frequency of the oscillator under the control of the output of a random or white noise source. Other prior art random pulse generators have operated by controlling the gating of the output signal of an oscillator by the use of a random or white noise source.

Known sources used for the control of the output of oscillators in the prior art have included tube shot noise generated in the normal operation of a gaseous discharge tube such as a thyratron. Such noise voltages may be considered as comprising a comparatively broad spectrum of frequencies which have approximately equal amplitude over a substantial frequency range. If two such noise spectra are summed or differenced, the time intervals between successive pulses in the resultant spectrum in excess of any specified amplitude does not follow any discernable pattern. However, the average interval between a large number of pulses in excess of a specified amplitude is under the influence of the specified amplitude. Thus an average operating frequency can be controlled to a certain extent by the adjustment of the specified amplitude. The ambient thermal noise produced in a resistor such as a thin-film metal resistor also falls into this category of random or white noise and avoids the use of the gaseous discharge tube with its attendant power supply and thermal protection disadvantages. The present invention utilizes the white noise generated by normal thermal agitation in a thin-film metal resistor. More particularly, the invention uses the differential between the two white noise pulse spectra produced by a pair of such thin-film metal resistors. This may be considered as an analog wave form comprising a series of pulses, random in occurence, and having random amplitudes. The use of the noise output differential from a pair of such thin-film metal resistors also has the advantage over the prior art type of tube shot noise sources of requiring no high voltage power supply or any particular special thermal cooling apparatus for its usage.

Amplitude discrimination of the differential random noise wave form may be used as a means of controlling the median or average frequency of occurence of the noise pulses from the differential noise source. In this mode of operation, if a discriminator level is set to discriminate against all pulses below a certain selected height, then as this discriminator level is lowered more pulses exceeding the selected height will occur per unit of time at the discriminator output. Thus the discriminator can be used to control the means or average operating frequency of the noise source without disturbing the relative randomness of the occurence of the noise pulses themselves in the differential noise generator wave form.

Accordingly, it is an object of the invention to provide a wave train of rectangular shape, random interval and random duration pulses.

It is a further object of the present invention to supply a wave train of random interval and random width rectangular pulses whose average frequency of occurence is controllable within the prescribed limits.

It is a further object of the present invention to provide a wave train of random interval and random width whose mean frequency may be varied from as little as ten hertz to one megahertz.

BREIF DESCRIPTION OF THE INVENTION

The above and other objects, features, and advantages of the invention are provided in a programmable random pulse generator comprising a differential resistive noise source and having a pulse discriminator and count rate selector circuit which is used to select pulses occurring above a certain discriminator level. As the discriminator level is lowered the frequency of occurence of pulses exceeding the discriminator level increases. Output from the discriminator circuit is supplied to pulse shaping circuits. The shaping circuit outputs are supplied to appropriate gating logic circuits to produce constant amplitude randomly occurring pulses which are utilized to control the output of a pair of timing one-shot multivibrators. The output of the multivibrators are then provided to appropriate driving circuits which form a wave train of rectangular pulses having random widths and random interval separation. Other features of the invention include analog metering circuits together with means for calibrating the analog metering circuits. Provision is made for external triggering input as an option in lieu of the differential random noise source as a means of controlling the output wave train.

The above brief description as well as further objects, features, and advantages of the invention will be more fully appreciated by reference to the following detailed description of the invention when taken in conjunction with the accompanying drawings wherein:

DESCRIPTION OF THE ILLLUSTRATED EMBODIMENT

Figure 1:
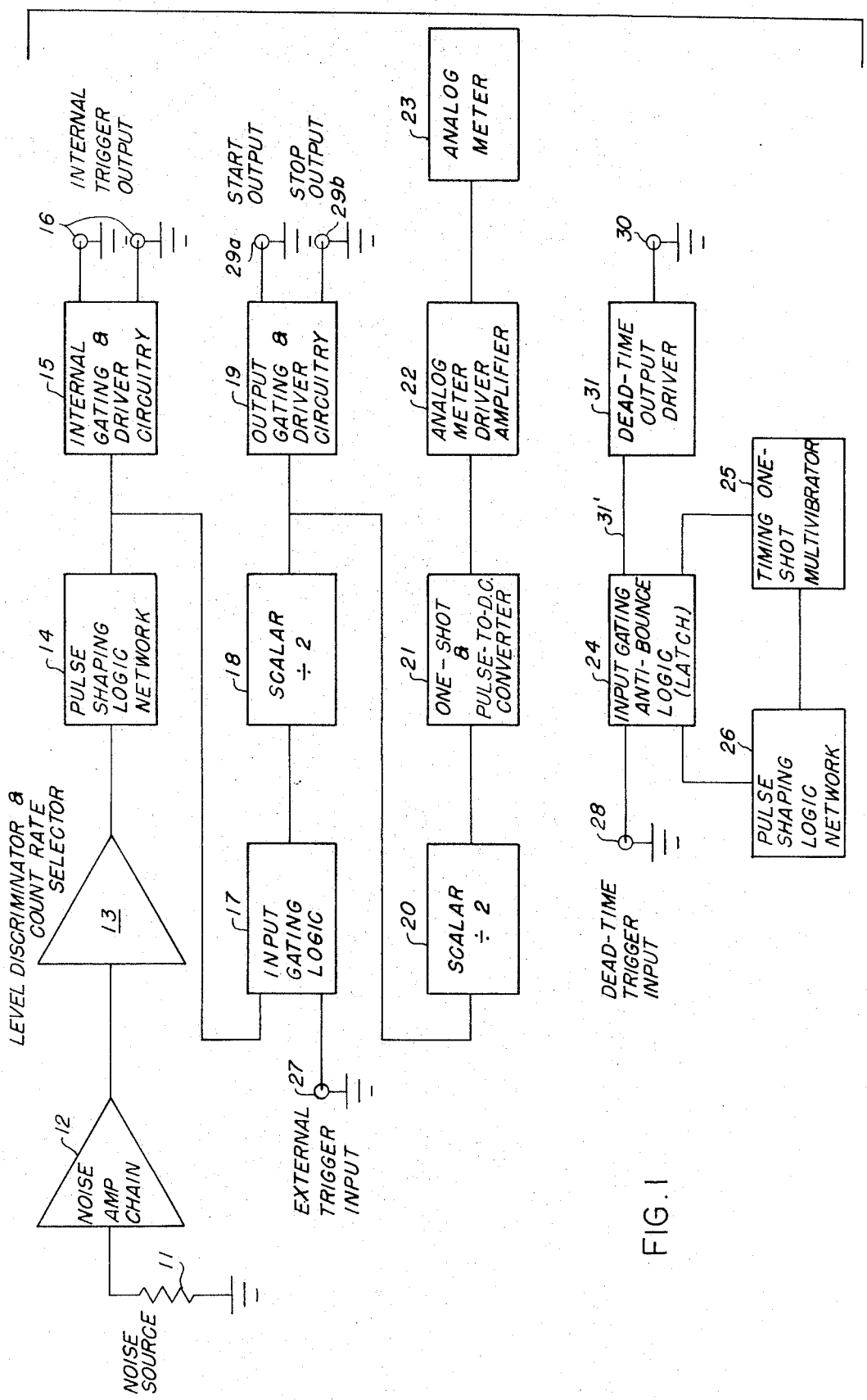
FIG. 1 is a block diagram showing a preferred embodiment of the random noise pulse generator circuit of the present invention.

Referring initially to FIG. 1, a random noise pulse generator according to the present invention is shown in block diagram form. A noise source 11 comprising two input thin-film resistors and the differential input stage of a first differential amplifier in the noise amplifier chain 12 is shown. The noise pulses produced by this differential noise source are random in occurrence and amplitude at the output of the noise amplifier chain 12. These random pulses are supplied as input to a level discriminator and count rate selector circuit 13 whose function will be described in more detail subsequently. The level discriminator and count rate selector circuitry 13 converts these pulses to randomly occurring pulses having a constant amplitude.

The constant amplitude and random interval output pulss from the level discriminator and count rate selector circuit 13 are supplied as input to a pulse shaping logic circuit 14. The pulse shaping logic ciricuit 14 transforms these into sharp pulses of approximately 30 nanosecond duration which occur at the leading edge of the input pulses. The output pulses from the pulse shaping logic circuit 14 are supplied as input to an internal gating driver circuit 15. The internal gating driver circuit 15 amplifies these pulses to a usable level and routes them to the internal trigger outputs 16.

The output of the pulse shaping logic circuit 14 is also supplied as one input to the input gating logic circuit 17. A second input to the input gating logic circuit 17 is supplied from an external trigger input 27. The external/internal gating logic circuit 17 determines the operating mode of the random pulse generator of the present invention. If an input is supplied at the external trigger input 27, this input is used and the randomly occurring pulses from the pulse shaping logic circuit 14 are diverted. The external trigger input 27 provides a means for supplying a calibration signal to the analog metering circuit (20–22) to be subsequently described.

The internal mode of operation of logic circuit 17 utilizes the differential noise source pulses provided by pulse shaping logic circuits 14 as, in this case, no input is available from the external trigger input lead 27. In any event, the output of the external/internal gating logic circuit 17 is supplied to a divide by two scalar circuit 18. The output of this scalar 18 is differentiated on its positive going edges and level shifted to produce standard amplitude negative NIM logic pulses. These pulses are supplied to the output gating driver circuit 19 and from thence to output gating terminals 29 for further use as will be subsequently described. The output of the divide by 2 scalar 18 is also supplied to a second divide by 2 scalar 20 whose output in turn is provided as input to a timing one-shot and pulse-to-DC converter circuit 21. The output of the pulse-to-DC converter circuit 21 is supplied as input to an analog meter driver amplifier 22 which drives an analog meter 23 to indicate the output.

In the case where external trigger inputs are used, a known frequency supplied at the external trigger input terminal 27 is routed by the input gate of logic circuit 17 through the scalars 18 and 20 and converted to a DC level in the pulse-to-DC converter portion of the circuit 21. This analog signal is used to drive the analog meter. In this manner, if a known frequency signal is supplied at the external trigger input 27 the analog meter 23 may be calibrated in accordance with the frequency of this known signal to provide a count rate meter function.

The signals from the output gating driver circuit 19, which as previously described are standard negative polarity logic pulses, are supplied to "start" and "stop" output terminals 29a and 29b, respectively. The time difference between the pulse occurring on the "start" output 29a and the pulse occurring on the "stop" output 29b is equal to the interval of time separating the successive internal trigger pulses supplied on the output leads 16. These negative going output pulses may then be supplied to standard time-to-pulse-height converters for the purpose of evaluating· any departure from ideal randomness and the average dead-time of the random noise pulse generator of the present invention.

To generate the randomly occurring rectangular output pulses, the very narrow positive polarity pulses from the internal trigger outputs 16 are used as input to the dead-time trigger input 28 of the anti-bounce logic circuit 24. The anti-bounce logic circuit 24, which will be described in more detail subsequently, functions to prevent multiple pulsing or erratic operation of the system due to input pulse ringing. One of the outputs of the anti-bounce logic circuit 24 is fed to a timing circuit 25 comprising two one-shot multivibrators connected in series. These multivibrators determine the width of the rectangular output pulse. The input gating anti-bounce logic circuits 24 comprise a latch circuit which, when properly set, supplies the rectangular output pulse from the pulse shaping logic network 26 via line 31' to a dead-time output driver circuit 31. The dead-time output driver inverts this signal, amplifies it, and produces this output on the dead-time interval output terminal 30 in the form of positive going rectangular pulses of random length and with a random duration between such pulses.

The pulse shaping logic circuit 26 generates a negative going pulse every time its input signal changes from a low to high value. The narrow negative going pulse from the pulse shaping logic circuit 26 is used to reset the anti-bounce logic latch 24.

The dead-time output driver circuits 31 comprise an emitter follower amplifier and an inverter which present the rectangular pulses of random duration and with random separation to the output terminal 30.

Figure 2:
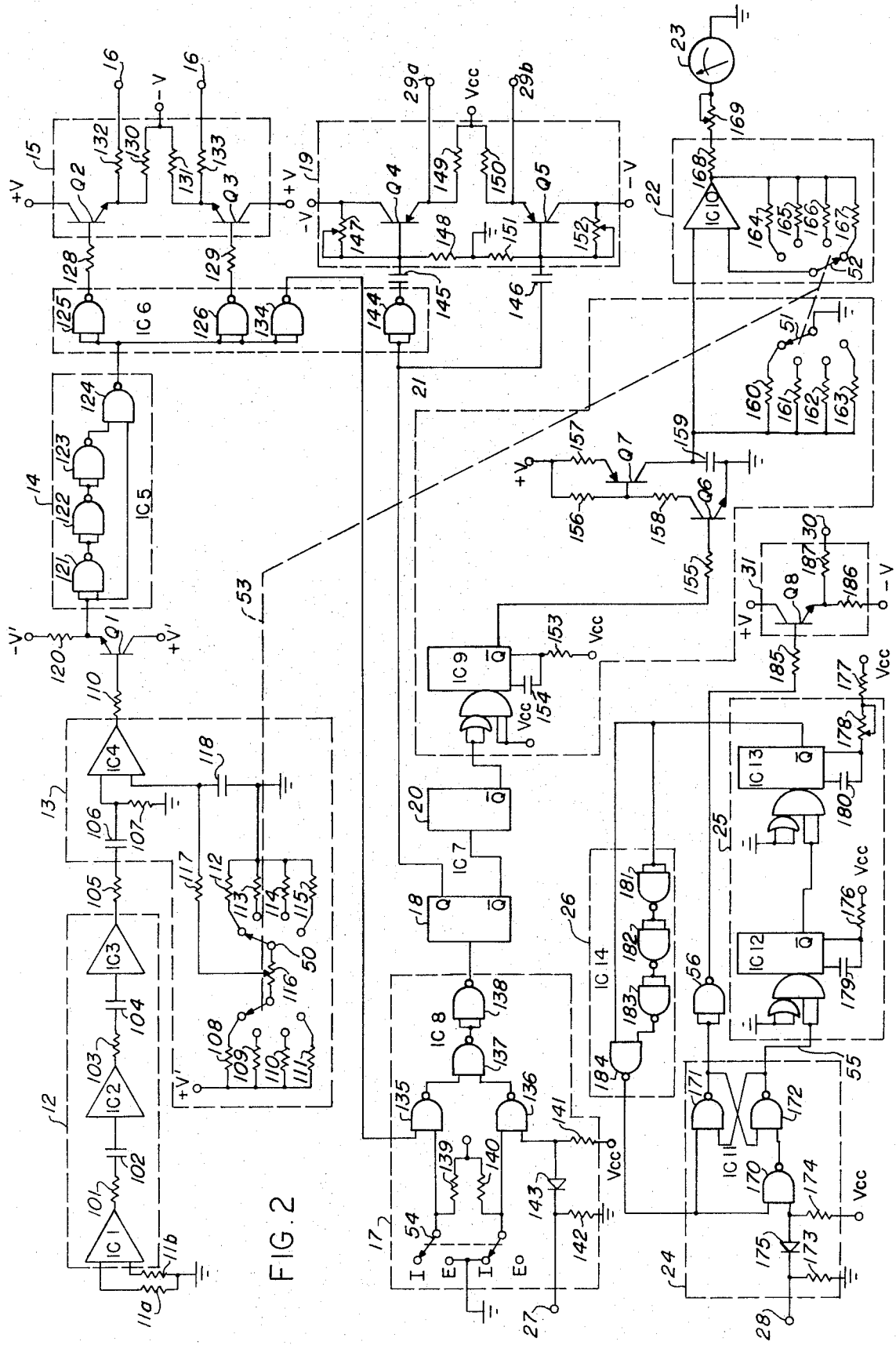
FIG. 2 is a schematic circuit diagram showing the circuitry used in the random noise pulse generator of the present invention.

Referring now to FIG. 2, the circuitry of FIG. 1 is shown in greater detail. It will be noted that the block of FIG. 1 corresponds to the dotted boxes of FIG. 2 and are designated by the same numerals. The thin-film metal resistors 11a and 11b are connected to the inverting and non-inverting inputs of a first differential amplifier stage, IC1, respectively in the wide band amplifier noise amplifier chain 12. White noise voltage pulses produced by thermal agitation of the resistors 11a and 11b are then effectively subtracted by the differential amplifier IC1 to produce a voltage wave form comprising a series of randomly occurring voltage pulses of randomly varying amplitude. The output of the amplifier IC1 is coupled to the input of amplifier IC2 by resistor 101 and capacitor 102. The output of amplifier IC2 is coupled to the input of IC3 by resistor 103 and capacitor 104. Amplifiers, IC1 IC2, and IC3 form the noise amplifier chain 12. The output of the noise amplifier chain 12 is then coupled to one input of the differential comparator IC4 by resistor 105 and capacitor 106. A biasing resistor 107 is also connected to this input. The second input to the IC4 is provided by a resistive voltage divider network comprising resistors 108–115. A potentiometer 116 provides fine adjustment and resistor 117 limits the input bias current to the comparator IC4. A capacitor 118 prevents noise spikes from appearing at the input of IC4. The discrimination level is set by the switch 50 which selects the appropriate resistors from the resistive divider network providing a stable DC voltage level for comparison to the output of the noise amplifier chain 12. The level discriminator switch 50, as previously described, determines the effective frequency of operation of the unit by discriminating against noise voltage input pulses below a certain selected amplitude level. The switch 50 is ganged (as indicated by dotted line 53) to switches 51 and 52 in the buffer driver circuit 22 in order to appropriately scale the amplification of the analog signals supplied to the analog meter 23 and the buffer driver amplifier circuit 22. The output of IC4 is coupled to transistor Q1 through a resistor 119. The transistor $Q_1$ is connected in the emitter follower configuration having an emitter resistor 120, and providing the input to the pulse shaping logic circuit 14. The pulse shaping logic circuit 14 comprises a NAND gate chain formed by gates 121, 122, 123 and 124 of IC5. The circuit 14 transforms pulses from the transistor Q1 into pulses of very short duration (approximately 30 nanoseconds) at the leading edge of the input pulses. The pulses present at the output of the circuit 14 are inverted by NAND gates 125 and 126 of IC6, and supplied to the internal trigger output buffer circuit 15 through resistors 128 and 129 transistors Q2 and Q3. Resistors 130 and 131 provide biasing for the driver transistors Q2 and Q3. The output of the transistors Q2 and Q3 are supplied to the internal trigger output terminals 16 through resistors 132 and 133.

The output pulses from IC5 are also supplied to gate 134 of IC6 which is employed as an inverter. The output of gate 134 is then fed to one input of the external-/internal gating logic circuit 17. The circuit 17 includes IC 8 having gates 135, 136, 137 and 138. A manually operated switch 54 selects either the external trigger input from external trigger input terminal 27 or the internal trigger from gate 134 of IC6. Resistors 139, 140, 141, and 142 are provided for biasing, and diode 143 functions as a blocking diode.

The output of the external/internal gating logic circuit 17 is supplied to the input of flip-flop 18 (½ IC7).

The Q output of flip-flop 18 is inverted and differentiated on its positive going edge by NAND gate 144 of IC6 which supplies the signal to the "start out" gating output terminal 29a, through driver transistor Q4. The output of gate 144 is coupled to the transistor Q4 by a capacitor 145. The uninverted portion of the Q output of flip-flop 18 is supplied to the "stop out" gating output terminal 29b via transistor Q5. The transistor Q5 is also capacitively coupled by capacitor 146. Necessary biasing resistors 147–152 are provided for transistors Q4 and Q5. As previously described, the time difference between the "start" and "stop" output, terminals 29a and 29b is equal to the interval of time separating successive internal trigger outputs and thus provides easy interface with standard time-to-pulse height converters for evaluating the system for true randomness.

The $\overline{Q}$ output of flip-flop 18 supplies a second flip-flop 20 (½ IC7) with an input signal. The $\overline{Q}$ output from flip-flop 20 provides an input signal to a one-shot multivibrator (IC9) comprising a portion of the timing one-shot and pulse-to-DC converter circuit 21. Circuit timing is provided by resistor 153 and capacitor 154. The $\overline{Q}$ output of IC9 is supplied to a pulse-to-DC converter circuit comprising transistors Q6 and Q7. The $\overline{Q}$ output of IC9 is coupled to transistor Q6 by resistor 155. Necessary biasing resistors 156, 157, and 158 are provided for transistors Q6 and Q7. A filter capacitor 159 is provided on the output of Q7. As previously discussed, the gain of circuit 21 is adjusted by switch 51 which is ganged with switch 50. The gain is controlled by a resistor network comprising resistors 160, 161, 162, and 163. The DC output from the circuit 21 is supplied to a buffer driver amplifier circuit 22, comprising an operational amplifier IC10, a gain control having a resistive feedback network, including resistors 164, 165, 166, and 167 and a switch 52. The switch 52 is ganged with switches 50 and 51 as indicated by dotted line 53. The output from the buffer driver circuit 22 is supplied to the analog meter 23 through a resistor 168 and a calibrating potentiometer 169 to appropriately display the average counting rate or frequency of the random pulses produced by the random pulse generator of the present invention.

The very narrow positive going voltage pulses from the internal trigger output 16 are supplied via dead-time trigger input 28 to the input of the anti-bounce logic circuit 24. The circuit 24 prevents multiple pulsing or erratic operation which could be caused by ringing of the input pulse from the internal trigger output 16 by employing IC 11 in which NAND gates 170, 171, and 172 form a latch. Biasing resistors 173 and 174 and a blocking diode 175 are provided to prevent noise spikes from appearing at the input to the anti-bounce circuit 24. One output of circuit 24 is supplied via line 55 to timing circuit 25 comprising a first one-shot multivibrator IC12 which is connected in series with a second one-shot multivibrator IC13. Timing resistors 176 and 177, potentiometer 178, and capacitors 179 and 180 are provided for determining the width of the rectangular output pulse ultimately produced by the random pulse generator. The $\overline{Q}$ output of the IC13 is connected to a second pulse shaping circuit 26 IC14, comprising NAND gates 181, 182, 183, and 184. The operation of the circuit 26 is similar to circuit 14 previously described. The negative going pulses generated by the pulse shaping circuit 26 are used to reset the anti-bounce circuit 24.

The second output of the circuit 24, gate 171 of IC11 is inverted by gate 56 of IC11 and buffered by transistor Q8 connected in the emitter follower configuration. Resistors 185 and 186 are provided for biasing the transistor Q8. The output of the dead-time interval driver circuit 31 is at terminal 30. Resistor 187 limits the amount of current supplied at the output terminal 30. The transistor Q8 produces a rectangular output voltage pulse at the terminal 30. The output pulses have a random duration and a random interval determined by the interval between the internal trigger output pulses of terminal 16.

Components used in the illustrated form of random pulse generators of the present invention are listed in the following Table.

TABLE

| REFERENCE CHARACTER | Resistors RATING IN OHMS | |
|---|---|---|
| 11a, 11b, 132, 133, 142, 173, 187 | 51 | |
| 101, 103, 105 | 2.2 | K |
| 107 | 10 | K |
| 108 | 42.2 | K |
| 109 | 60.4 | K |
| 110 | 41.2 | K |
| 111 | 30 | K |
| 112 | 806 | |
| 113 | 2 | K |
| 114 | 4.32 | K |
| 115 | 3.48 | K |
| 117, 120, 155, 156, 158 | 1 | K |
| 119, 128, 129, 185 | 47 | |
| 130, 131, 186 | 2.7 | K |
| 139, 140, 141, 174 | 4.7 | K |
| 148, 151 | 301 | |
| 149, 150 | 330 | |
| 153 | 6.34 | K |
| 157 | 2.26 | K |
| 160, 167 | 10 | M |
| 161, 166 | 1 | M |
| 162, 165 | .1 | M |
| 163, 164 | .01 | M |
| 168 | 6.49 | K |
| 176 | 12 | K |
| 177 | 4.99 | K |

| REFERENCE CHARACTER | POTENTIOMETERS RATING IN OHMS |
|---|---|
| 116 | 1 K |
| 147, 152, 178 | 20 K |
| 169 | 5 K |

| REFERENCE CHARACTER | CAPACITORS RATING IN MICROFARADS (Unless Specified) |
|---|---|
| 102, 104, 106, 179, 180 | .01 |
| 118 | 22 |
| 145, 146 | 5 pf |
| 154 | 47 |

| REFERENCE CHARACTER | INTEGRATED CIRCUITS TYPE | MANUFACTURER | MANUFACTURER'S ID NO. |
|---|---|---|---|
| IC 1, IC2, IC3 | Operational Amp | Fairchild | μ733 |
| IC4 | Differential Comparator | Fairchild | μ710 |
| IC5, IC6, IC8, IC11, IC14 | Quad 2-input NAND | Texas Instruments | SN7400 |
| IC7 | Dual J-K Edge-Triggered Flip-Flop | Texas Instruments | SN74H103 |
| IC9, IC12, IC13, | Monostable Multivibrator | Fairchild | μ9601 |
| IC10 | Operational Amplifier | National | LM208 |

TABLE

| REFERENCE CHARACTER | TRANSISTSORS MANUFACTURER | MANUFACTURER'S ID NO. |
|---|---|---|
| Q1, Q2, Q3, Q8 | Fairchild | 2N3641 |
| Q4, Q5 | Fairchild | 2N3638 |
| Q6 | Motorola | 2N4275 |
| Q7 | Motorola | 2N3906 |

| REFERENCE CHARACTER | DIODES MANUFACTURER | MANUFACTURER'S ID NO. |
|---|---|---|
| 143 | Motorola | 1N914 |
| 175 | Motorola | 1N914 |

| REFERENCE CHARACTER | METER MOVEMENT MANUFACTURER | SPECIFICATIONS |
|---|---|---|
| 23 | General Electric | 50-18511DRD1 |

Random pulses of the present invention thus provide a relatively economical and compact source of rectangular pulses whose frequency may be controlled by the setting of the count rate selector switch 50. The random noise generator of the present invention is comprised of all solid state circuitry. This circuitry does not require high voltage power and is easily evaluated, monitored, and calibrated by the means provided.

The above description may make other alternative embodiments of the invention apparent to those skilled in the art. It is the aim of the appended claims to cover all such stages of modifications as fall within the true spirit and scope of the invention.

We claim:

1. A programmable pulse generator capable of producing random length and random separation rectangular shaped voltage pulses, comprising:
   means for producing two essentially constant amplitude, randomly occurring amplitude excursion analog voltage wave forms having a relatively wide frequency bandwidth;

means connected to said analog voltage producing means, for forming the voltage difference of said two analog voltage wave forms to provide a single, relatively wide bandwidth differential analog voltage wave form having random amplitude and random occurrence voltage components;

means connected to said voltage difference forming means for selecting only those voltage components exceeding a selected amplitude in said single differential analog voltage wave form and for producing relatively short duration, constant amplitude logic voltage pulses corresponding in time occurrence to those components exceeding said selected amplitude;

means connected to said voltage selecting means for producing rectangular shaped voltage pulses of controllable duration and controllable time separation; and means connected to said voltage selecting means for producing rectangular shaped voltage pulses of controllable duration and controllable time separation; and means connected to said means for producing rectangular shaped voltage pulses and responsive to said constant amplitude logic voltage pulses, for controlling the duration and time separation of said means for producing rectangular shaped voltage pulses.

2. The apparatus of claim 1 wherein said means for producing two essentially constant amplitude, randomly occurring amplitude excursion analog voltage wave forms having a relatively wide frequency bandwidth comprises a pair of thin-film metal resistors which are thermally agitated to produce said pair of analog voltage wave forms.

3. The apparatus of claim 1 and further including means for protecting said controlling means from any ringing or oscillatory effects of said relatively short duration constant amplitude logic voltage pulses.

4. The apparatus of claim 3 wherein said protecting means includes logic latch means responsive to said relatively short duration constant amplitude logic voltage pulses.

5. The apparatus of claim 1 and further including means for monitoring the average operating frequency of said programmable pulse generator.

6. The apparatus of claim 5 and further including means for calibrating said means for monitoring the average operating frequency of said programmable pulse generator.

7. The apparatus of claim 1 wherein said means for selecting only those voltage components exceeding a selected amplitude in said single differential analog voltage wave form includes:

voltage level discriminator means for accepting an input voltage analog wave form having many components producing an output wave form comprising an analog wave form of only those voltage components exceeding the discriminator level; and means for varying the discriminator level of said voltage discriminator means.

* * * * *